United States Patent [19]

Born et al.

[11] Patent Number: 5,133,889

[45] Date of Patent: * Jul. 28, 1992

[54] POLYSULFURIZED OLEFIN COMPOSITIONS, THEIR PREPARATION AND USE AS ADDITIVES IN LUBRICANTS

[75] Inventors: Maurice Born, Nanterre; Lucienne Briquet, Rueil Malmaison; Jacques Lallement, Aubervilliers; Guy Parc, Rueil Malmaison, all of France

[73] Assignee: Institut Francais Du Petrole, Rueil Malmaison, France

[*] Notice: The portion of the term of this patent subsequent to Sep. 3, 2008 has been disclaimed.

[21] Appl. No.: 279,169

[22] Filed: Dec. 2, 1988

[30] Foreign Application Priority Data

Dec. 2, 1987 [FR] France .................... 87 16847

[51] Int. Cl.$^5$ ............... C10M 135/02; C10M 135/20
[52] U.S. Cl. .......................................... 252/45; 568/26
[58] Field of Search ................... 252/45; 568/18, 26

[56] References Cited

U.S. PATENT DOCUMENTS

| | | | |
|---|---|---|---|
| Re. 31,522 | 2/1984 | Rieder | 252/34 |
| 3,471,404 | 10/1969 | Myers | 252/45 |
| 3,697,499 | 10/1972 | Myers | 252/48.8 |
| 4,147,640 | 4/1979 | Jayne et al. | 252/45 |
| 4,188,297 | 2/1980 | Jayne et al. | 252/45 |
| 4,204,969 | 5/1980 | Papay et al. | 252/45 |
| 4,225,488 | 9/1980 | Horodysky et al. | 252/45 |
| 4,563,302 | 1/1986 | Griffin et al. | 252/45 |
| 4,578,202 | 3/1986 | Urban et al. | 252/33.4 |
| 4,631,139 | 12/1986 | Burton et al. | 252/49.3 |
| 4,645,610 | 2/1987 | Born et al. | 252/45 |
| 4,795,576 | 1/1989 | Born et al. | 252/45 |
| 4,839,069 | 6/1989 | Born et al. | 252/45 |
| 5,045,221 | 9/1991 | Born et al. | 252/45 |

OTHER PUBLICATIONS

Hobson, G. D. et al., (editors), *Modern Petroleum Technology*, 4th Ed., The Institute of Petroleum, Great Britain, pp. 752-754.

*Primary Examiner*—Prince Willis, Jr.
*Assistant Examiner*—Jerry D. Johnson
*Attorney, Agent, or Firm*—Millen, White & Zelano

[57] ABSTRACT

Described are polysulfurized olefin compositions defined as being prepared by reaction of sulfur monochloride and/or dichloride with at least one monoolefin with 6 to 12 carbon atoms to form an addition product (or "adduct"), then by reaction of said adduct with a mercaptate or mercaptate-polysulfide of an alkaline metal or ammonium, itself obtained, for example, by reaction of a mercaptan with an alkaline hydroxide or with ammonia then, if need be, with sulfur, preferably in an alcoholic medium. These polysulfurized olefin compositions can be used as extreme-pressure additives in gearing oils or in oils for use in metal-working.

17 Claims, No Drawings

POLYSULFURIZED OLEFIN COMPOSITIONS, THEIR PREPARATION AND USE AS ADDITIVES IN LUBRICANTS

The invention concerns the field of sulfurized organic additives particularly used to improve extreme-pressure properties of lubricants. In particular, it concerns new polysulfurized olefin type products, their preparation and their use as additives in mineral or synthetic lubricants.

In French patent application, filed Oct. 17, 1986, under National Registration number 86/14576, the applicant has already described polysulfurized olefin compositions obtained from a process comprising:

a step (1) of reacting at least one compound, chosen from sulfur monochloride or dichloride with at least one aliphatic monoolefin with 2 to 5 carbon atoms, having the formula $R^1-C(R^2)=CH_2$, in which $R^1$ represents a hydrogen atom or an alkyl radical with 1 to 3 carbon atoms and $R^2$ represents a hydrogen atom or a methyl radical, in such a way as to form an addition product:

a step (2) of reacting said addition product with at least one mercaptate or a mercaptate-polysulfide having the general formula $R^3S_xM$, in which $R^3$ represents an aliphatic an aliphatic radical with at least one functional group, an aromatic radical, an aromatic radical substituted with at least one aliphatic radical, or an heterocyclic radical; M represents a monovalent atom or group corresponding to a mineral base of the formula MOH and x has an average value of at least 1; and possibly:

a step (3) of contacting the product from step (2) with an aqueous solution of a mineral base.

It has now been discovered that it is possible to prepare compositions of polysulfurized olefins not only from aliphatic olefins with 2 to 5 carbon atoms but also from aliphatic monoolefins with a higher carbon number.

The polysulfurized olefin compositions of the invention show, in particular, excellent solubility in mineral lubricating oils and in synthetic lubricating oils (in particular, of the hydrogenated polyalpha-olefin type). In some of these compositions, solubility may even be total. Depending on their sulfur content, the polysulfurized olefin compositions of the invention will be favorably used as extremepressure additives for gearing oils or for oils used in metalworking.

Generally speaking, the polysulfurized olefin compositions of the invention can be defined as being obtained by a process comprising:

a step (1) of reacting at least one compound chosen from sulfur monochloride or dichloride with at least one aliphatic monoolefin having 6 to 12 carbon atoms and possibly a minor proportion of at least one aliphatic monoolefin with 2 to 5 carbon atom, in such a way as to form an addition product or adduct.

A step (2) of reacting at least one addition product, obtained in a step such as step (a), (generally in an alcoholic medium) with at least one mercaptate and/or mercaptate-polysulfide having the general formula $R^3S_xM$, in which $R^3$ represents an aliphatic radical, containing for example 1 to 14 carbon atoms, this aliphatic radical possibly including at least one functional group (for example, at least one hydroxy group), an aromatic radical, possibly substituted by one or more aliphatic radicals and containing, for example, 6 to 14 carbon atoms, or a heterocyclic radical containing at least one heteroatom chosen from nitrogen, sulfur and oxygen; M represents a monovalent atom or group corresponding to a mineral base of the general formula MOH; and x has an average value of at least 1 and can increase up to 7, for example; and possibly:

a step (3) of contacting the product from step (2) with an aqueous alkaline solution.

The aliphatic monoolefin with 6 to 12 carbon atoms involved in step (1) complies, more particularly with the general formula $R^1-C(R^2)=C(R^3)-R^4$ in which $R^1, R^2, R^3$ and $R^4$ each represent a hydrogen atom or an alkyl radical with 1 to 10 carbon atoms. For example, it can be a hexene, dipropylene, a heptene, an octene, diisobutylene, a nonene, tripropylene, a decene, an undecene, a dodecene, tetrapropylene or tri-isobutylene. Two or more monoolefins such as those mentioned above can be used. Olefin cuts obtained from dimerization of propylene ("DIMERSOL" process) and containing a high proportion of hexenes can be given as an example.

The aliphatic monoolefin with 2 to 5 carbon atoms that can be used in a minor proportion together with the previous one can have a formula of the type $R^5-C(R^6)=C(R^7)-R^8$, in which $R^5, R^6, R^7$ and $R^8$ each represent a hydrogen atom or an alkyl radical with 1 to 3 carbon atoms. It will most usually be isobutene.

Usually, 1.5 to 2.5 moles of the monoolefin (or mixture of monoolefins) per mole of sulfur mono- and/or dichloride are used. The liquid sulfur mono- and/or dichloride is generally introduced into the olefin or mixture of olefins at 20°-80° C., more specifically, at 30°-50° C.

In addition product, or adduct, obtained at the end of step (1) is a mixture of sulfurized compounds in which the average proportion of sulfur can be about 1 to 2 gram-atoms per mole, depending on whether sulfur monochloride, sulfur dichloride or a mixture of both is used to start with. The proportion of chlorine is about 1 to 2 gram-atoms per mole of product. It should be understood that where a mixture of olefins is used, the number of moles of addition product referred to is the overall number of moles, taking into account the average molar mass of the starting mixture of olefins.

In step (2), wherein mercaptate and/or mercaptate-polysulfide of the formula $R^3S_xM$ is reacted with the adduct obtained at the end of step (2), preferably in an aliphatic monoalcohol, said adduct is generally added to an alcoholic solution of said mercaptate or mercaptate-polysulfide in a proportion such that said mercaptate or mercaptate-polysulfide represents a molar excess of about 0.1 to 70% with reference to the stoichiometry of 1 mole per gram-atom of chlorine in said adduct, the reaction medium being maintained, for example, at a temperature of $-10°$ C. to the reflux temperature of the alcoholic solvent used. Addition of the mercaptate or mercaptate-polysulfide in alcoholic solution to the addition product obtained at the end of step (1) can also be envisaged, the properties of the final product (polysulfurized olefin composition) being unchanged.

In step (2), a mixture of two or more adducts, each prepared according to the method in step (1) from a single monoolefin or a mixture of monoolefins, as described hereinabove, can also be used.

The mercaptates and mercaptate-polysulfides involved in step (2) having the general formula $R^3-S_xM$ can be prepared by reacting, preferably in an alcoholic medium, at least one mercaptan having the general formula $R^3SH$ with a MOH mineral base, $R^3$ and M being as defined hereinabove, and possibly with elemental sulfur (in the case of preparation of a mercaptate-polysulfide, for which x has an average value greater than 1 and which can be up to about 7).

The following can be cited as examples of mercaptans of the formula $R^3SH$ which can be favorably used to prepare mercaptates or mercaptate-polysulfides: methylmercaptan, ethylmercaptan, n-propyl-mercaptan, n-butylmercaptan, isobutylmercaptan, tert-butylmercaptan, tert-nonylmercaptan, tert-dodecyl-mercaptan, mercaptoethanol, 3-mercapto-1,2-propanediol, phenylmercaptan, tolylmercaptan, as well as 2-mercaptobenzimidazole, 2-mercaptobenzothiazole, 2-mercapto-benzoxazole, 2-mercapto-1-methylimidazole, 2(and 4)-mercaptopyridines, 2-mercapto-3-pyridinol, 2-mercaptothiazoline and 5-mercaptotriazole.

The reaction between the mercaptan and the mineral base is usually carried out at a temperature of 20° to 100° C. The alcoholic medium can include at least one aliphatic monoalcohol containing, for example, 1 to 5 carbon atoms. Methanol is generally used. Depending on whether the mineral base used is soda, potash or ammonium hydroxide, the product obtained is a sodium, potassium or ammonium mercaptate of the formula $R^3$—SM (M representing Na, K or NH4).

In order to prepare a mercaptate-polysulfide, the mercaptate thus formed can be reacted with elemental sulfur. In this case, the elemental sulfur involved can be reacted with the mercaptate in a proportion of up to 10 gram-atoms per mole. This reaction can be effected at a temperature of 20-10 100° C.

At the end of step (2), a polysulfurized olefin composition is obtained which can then be treated, in a step (3), with an aqueous alkaline solution, in particular, an aqueous soda or potash solution having, for example, a concentration in mass of about 1 to 50%. The quantity of alkaline solution used can be, for example, 0.1 to 5 times the mass quantity of the raw polysulfurized olefin to be treated.

The polysulfurized olefin compositions of the invention usually have a sulfur content of 20 to 65% in mass. Those which contain 25 to 60% in mass can be favorably used as extreme-pressure additives in lubricating oils.

It is possible to adjust solubility in oils and the extreme-pressure properties by choice of the mercaptan used and the proportion of elemental sulfur employed in comparison with said mercaptan. In the majority of cases, they are totally soluble.

A first application of the polysulfurized olefin compositions of the invention (in particular those whose sulfur content is about 25 to 50%) is the formulation of oils for lubricating gearings. The base oils can be of mineral or synthetic origin. Synthetic oils include, in particular, olefin oligomers such as tri-, tetra- and pentamers of 1-decene obtained by oligomerization in the presence of LEWIS acids. Of course, other α-olefins can be used, for example, $C_6$ to $C_{14}$ α-olefins.

Alkylbenzenes, such as mono- and dialkylbenzenes, or synthetic esters from mono- or polycarboxylic acids (such as sebacic acid, fatty acids, etc.) and monoalcohols, or polyols (such as 2-ethylhexanol, trimethylolpropane, etc.) can also be used.

The polysulfurized olefins contemplated can thus be added to lubricating oils in concentrations of, for example, 0.5 to 10% in mass. These additives may be used in combination with phosphorcontaining additives such as metallic dialkyl- or diaryldithiophosphates and organic phosphites and phosphates.

Other conventional additives, such as antioxidants, anti-rust agents, copper passivators, anti-foaming agents and friction reducers can be added in the usual proportions.

Another application of the polysulfurized olefin compositions of the invention as extreme-pressure additives in lubricants (in particular those whose sulfur content is greater than about 50% in mass) especially concerns the formulation of oils used in metalworking (cutting, forming, etc.).

In this application, the concentration of the additive used is generally from 0.1 to 20%, and preferably, 0.5 to 5% in mass with reference to the lubricating oil. In this application, other conventional additives, such as chlorinated paraffins, can be added in a proportion corresponding to, for example, 2–10% in mass of chlorine with reference to the lubricating oil.

The following examples illustrate the invention. They should in no way be considered as limiting. Example 9 is given as a comparison.

EXAMPLE 1

620.8 g of diisobutylene (5.56 moles) are introduced into a 2 l reactor equipped with a stirrer and a condenser. 356.4 g of $S_2Cl_2$ (2.64 moles) are then added drop-wise, with stirring, over a period of 1 hour, the reaction temperature being maintained below 45° C. After reaction, 860 g of addition product, designated by the term "adduct", are collected (Cl=15.4% in mass).

In a second 1 l reactor equipped with a condenser, a stirrer and a device allowing distillation, 400 $cm^3$ of anhydrous methanol and 63.4 g of soda in pellet form (1.58 moles) are introduced. Stirring is continued until total dissolution of the soda occurs, then 142.6 g of tetra-butylmercaptan (1.58 moles) and 18.8 g of sublimed sulfur (0.59 gram-atom) are added. Methanol is refluxed to favorize the formation of alkaline polysulfide. In this preparation, the RSH/S molar ratio is 2.7.

Using a dropping funnel, 215 g of the previously prepared adduct are added drop-wise over a period of 0.5 hour.

Reflux is continued for another 7 hours and the methanol is then distilled off, at the same time introducing into the medium a volume of water equal to the volume of alcohol distilled.

After total elimination of the alcohol, the mixture is separated by settling. The organic phase recovered is then treated for 3 hours under reflux with a 10% in mass aqueous soda solution (125 g).

After settling, the organic phase recovered is washed twice with 200 $cm^3$ of distilled water, dried on anhydrous $Na_2SO_4$, filtered, then evaporated at 100° C. under reduced pressure.

In this way, 310 g of pale yellow oil are collected. Its physicochemical characteristics are given in table 1 (below).

EXAMPLE 2

The experimentation in example 1 is repeated but an alkaline mercaptate-polysulfide is prepared in the second reactor from 64.6 g of tert-butylmercaptan (0.72 mole), 28.7 g of soda in pellet form (0.718 mole), 60.58 g of sublimed sulfur (1.89 gram-atoms) and 200 $cm^3$ of methanol. In this example, the RSH/S molar ratio is 0.38.

The reaction is carried out under the conditions of example 1, using 150 g of the adduct diisobutylene/$S_2Cl_2$.

After reaction and without further treatment with soda, 213 g of an orangey oil are collected. Its characteristics are given in table 1 (below).

EXAMPLE 3

The experimentation in example 2 is repeated but the tertbutylmercaptan in the second reactor is substituted by the same molar quantity of methylmercaptan (34.6 g).

After reaction and without treatment with soda, 185 g of an orangey oil are collected. Its characteristics are given in table 1 (below).

EXAMPLE 4

The experimentation in example 1 is repeated with introduction into the first reactor of 394.4 g of an olefinic cut consisting of 85% by moles of hexenes and 15% of nonenes (olefinic cut obtained by dimerization of propylene according to the "DIMERSOL" process). 304 g of $S_2Cl_2$ (2.24 moles) are then added drop-wise over a period of 1 hour, maintaining the temperature below, or at, 30° C.

After reaction, 662 g of an addition product, which is designated by the term "adduct", are collected (Cl=23.8% in mass).

Experimentation is continued in the second reactor, using tert-butylmercaptan (2.58 moles), 103.2 g of soda in pellet from (2.58 moles), 236.2 g of sublimed sulfur (7.37 gram-atoms). In this example, the RSH/S molar ratio is 0.35.

After reaction and without treatment with soda, 624 g of an orangey-yellow oil are collected. Its characteristics are given table 1 (below).

EXAMPLE 5

The experimentation in example 1 is repeated, using 302 g of a $C_9$ olefinic cut (tripropylene: 2.4 moles) and 154 g of $S_2Cl_2$ (1.14 moles) in the second reactor.

After reaction, 430 g of of an addition product, designated by the term "adduct", is collected (Cl=13% in mass).

In a second 1 l reactor, 118.6 g of tert-butylmercaptan (1.32 moles), 52.7 g of soda in pellet form (1.32 moles), 141 g of sublimed sulfur (4.4 gram-atoms) and 600 cm³ of methanol are introduced. In this example, the RSH/S molar ratio is 0.3.

To the mercaptate-polysulfide obtained, 300 g of the adduct prepared in the first reactor are then added.

After reaction (7 hours under reflux) and without further treatment with soda, 374 g of a very dark oil are collected. Its characteristics are given table 1 (below).

EXAMPLE 6

173.2 g of diisobutylene (1.55 moles), in which 30.4 g of isobutylene (0.58 mole) are dissolved, are introduced into a 1 l reactor equipped with a stirrer. Using a dropping funnel, 132 g of $S_2Cl_2$ (0.98 mole) are added drop-wise, maintaining the reaction temperature around 20° C.

After reaction, 300 g of of an addition product, designated by the term "adduct", are collected (Cl=17.9% in mass).

In a second 1 l reactor equipped with a stirrer, a condenser and a device allowing distillation, 250 cm³ of methanol, 33.3 g of soda (0.832 mole) and 74.8 g of tert-butylmercaptan (0.832 mole) are successively introduced. After complete dissolution occurs, 9.9 g of sublimed sulfur (0.31 gram-atom) are added. Boiling for one hour is carried out to favorize formation of the alkaline mercaptate-polysulfide. In this example, the RSH/S molar ratio is 2.7.

Using a dropping funnel, 150 g of the adduct prepared in the previous reactor is introduced drop-wise over a period of 0.5 hour. It is left under reflux for 7 hours then, after treatment of the raw sulfurized additive, 178 g of a yellow oil are collected. Its physico-chemical characteristics are given in table 1 (below).

EXAMPLE 7

In a 1 l reactor containing alkaline mercaptate-polysulfide obtained from 62.4 g of tert-butylmercaptan (0.69 mole), 27.7 g of soda (0.69 mole), 74 g of sublimed sulfur (2.31 gram-atoms) and 200 cm³ of methanol, 150 g of a mixture consisting of 120 g of diisobutylene/$S_2Cl_2$ adduct prepared in example 1 and 30 g of tripropylene/$S_2Cl_2$ adduct prepared in example 5, are added. In this example, the RSH/S molar ratio is 0.3 and chlorine content of the adduct mixture is 14.9% in mass.

After reaction and without further treatment with soda, 208 g of an orangey oil are collected. Its physico-chemical characteristics are given table 1 (below).

EXAMPLE 8

The experimentation in example 7 is repeated with introduction of the alkaline mercaptate-polysulfide solution into the halogenated mixture. After reaction, 210 g of an orangey oil are collected. Its physico-chemical characteristics are very similar to those of the product obtained in the experimentation in example 7.

EXAMPLE 9

Comparative

Example 1 is repeated, but with replacement of diisobutylene with isobutylene, in the preparation of the adduct, in the same molar proportions as in example 1: 0.71 mole i.e. 40 g.

47.4 g of $S_2Cl_2$ were used (i.e. 0.35 mole).

Furthermore, the experimentation in example 2 is repeated in the second reactor. The RSH/S molar ratio is also 0.38. The reaction is continued as in example 1, using 83 g of the isobutene/$S_2Cl_2$ adduct, prepared as described above.

The physico-chemical characteristics of the product obtained are as follows:

| | |
|---|---|
| S % in mass | 57.5% |
| Cl % in mass | 170 ppm |
| Viscosity at 100° C. | 11 mm²/S |

In a test on solubility at 20% in mass in SAE 90 oil of a hydrogenated polyalphaolefin type, it observed that the additivated oil is turbid. The additive contemplated is not totally soluble.

TABLE 1

| Additive of example | molar RSH/S | molar RSH/NaOH | molar NaOH/Cl | Chlorine content of the additive (ppm) | S content of the additive (% mass) | Viscosity 100° C. (mm$^2$/s) | Solubility in SAE 90 Mineral oil | PAO |
| --- | --- | --- | --- | --- | --- | --- | --- | --- |
| 1 | 2.70 | 1 | 1.69 | 112 | 28.6 | 2.8 | Total | Total |
| 2 | 0.38 | 1 | 1.10 | 227 | 43.4 | 4.5 | Total | Total |
| 3 | 0.38 | 1 | 1.10 | 205 | 48.2 | 5.8 | Total | — |
| 4 | 0.35 | 1 | 1.10 | 187 | 51.2 | 6.2 | Total | Total |
| 5 | 0.30 | 1 | 1.20 | 265 | 46.0 | 3.8 | Total | Total |
| 6 | 2.70 | 1 | 1.32 | 202 | 31.1 | 2.5 | Total | Total |
| 7 | 0.30 | 1 | 1.10 | 154 | 44.5 | 4.4 | Total | Total |
| 8 | 0.30 | 1 | 1.10 | 158 | 44.6 | 4.4 | Total | Total |

SOLUBILITY OF ADDITIVES ACCORDING TO THE INVENTION IN LUBRICATING OILS

One of the main characteristics of the additives according to the invention concerns their remarkable miscibility with lubricating oils, both mineral and synthetic, and in particular, hydrogenated polyalphaolefins (PAO), and this despite their high sulfur content.

MEASUREMENT OF THE CORROSIVE EFFECT OF ADDITIVES ACCORDING TO THE INVENTION

Copper-blade corrosion tests were carried out according to ASTM D 130 (NF M07-015) procedures with a mineral oil SAE 90 containing additives of the invention in a proportion corresponding to a 2% in mass concentration in sulfur of the oil. The results obtained are given in table 2.

For compounding oils for automobile gearings, additives leading to a value less than or equal to 3 (particularly at 121° C.) are preferably used. For compounding oils for cutting ferrous metals, additives leading to high corrosion values are preferred.

EVALUATION OF EXTREME-PRESSURE PROPERTIES OF ADDITIVES ACCORDING TO THE INVENTION

Tests were carried out to detect extreme-pressure properties of the additives according to the invention, on the one hand, in formulations of the type for gearing oils and on the other hand, in formulations of the type for metal-working (ferrous) oils.

a) The additives of examples 1 and 6 were studied using a 4-ball machine according to ASTM D 2783 and ASTM D 2266 procedures, at a concentration of 0.69% in mass of sulfur, in a mineral oil SAE 90. The results obtained are given in table 3.

It is observed that the extreme-pressure properties of the additives according to the invention are very high and, because of this, can be used in compounding oils for gearings (industrial and/or in cars).

b) Tests were carried out to detect extreme-pressure properties of the additives prepared in examples 2 and 5 in formulations of oils for cutting ferrous metals, using a 4-ball machine according to ASTM D 2783 procedures.

Lubricating formulations consisted of a mineral oil 100 Neutral.Solvent containing 3% in mass of chlorine in the form of chlorinated paraffins, and 1% in mass of sulfur in the form of sulfurized additives of examples 2 and 5. The results obtained are given in table 4.

The results obtained show that the additives of the invention lead to very high extreme-pressure qualities. This explains their importance in the compounding of oils for metal-working.

TABLE 2

| Additive of example | [S] in the additive (% mass) | % additive in the mineral oil (% mass) | 3 hours at 100° C. | 3 hours at 121° C. |
| --- | --- | --- | --- | --- |
| 1 | 28.6 | 7.00 | 1a | 2a |
| 2 | 43.4 | 4.60 | 4c | — |
| 3 | 48.2 | 4.15 | 4c | — |
| 4 | 51.2 | 3.90 | 4c | — |
| 5 | 46.0 | 4.35 | 4c | — |
| 6 | 31.1 | 6.40 | 1a | 2a |
| 7 | 44.5 | 4.50 | 4c | — |
| 8 | 44.6 | 4.50 | 4c | — |

TABLE 3

| Additive of example | % mass additive in SAE 90 | Load/Wear Index (Kgf) | Load/Wear Index (N) | Welding load (Kgf) | Welding load (N) | ⌀ of ball inprint 1 h under 40 kgf (392.4N) (mm) |
| --- | --- | --- | --- | --- | --- | --- |
| — | — | 22.2 | 217.8 | 160 | 1569.6 | 0.80 |
| 1 | 2.41 | 62.0 | 608.3 | 400 | 3924.0 | 0.65 |
| 6 | 2.22 | 65.2 | 639.7 | 400 | 3924.0 | 0.61 |

TABLE 4

| Chlorinated paraffin (% mass) | Additive of example | S % mass of sulfurized additive | % mass of additive in the oil | 4-BALL TESTS E.P. Load/Wear Index (Kgf) | (N) | Load before seizing (Kgf) | (N) | Welding load (Kgf) | (N) |
| --- | --- | --- | --- | --- | --- | --- | --- | --- | --- |
| Without | Without | — | — | 21.4 | 209.9 | 50 | 490.5 | 116 | 1138.0 |
| 4.62 | Without | — | — | 38.1 | 373.8 | 80 | 784.8 | 200 | 1962 |
| Without | 2 | 43.4 | 2.3 | 45.2 | 413.1 | 80 | 734.8 | 315 | 3090.1 |
| 4.62 | 2 | 43.4 | 2.3 | 96.2 | 883.1 | 100 | 981.0 | 620 | 6082.2 |
| Without | 5 | 46.0 | 2.2 | 47.1 | 432.3 | 80 | 784.8 | 315 | 3090.1 |
| 4.62 | 5 | 46.0 | 2.2 | 98.7 | 906.1 | 100 | 981.0 | 620 | 6082.2 |

What is claimed is:

1. A polysulfurized olefin composition obtained by a process comprising:

(1) reacting at least one of sulfur monochloride or dichloride with at least one aliphatic monoolefin having 6 to 12 carbon atoms, so as to form an addition product and (2) reacting at least one addition product obtained at the end of (1) with at least one mercaptate or mercaptate-polysulfide of the general formula $R^3S_xM$, in which $R^3$ represents an aliphatic radical, an aliphatic radical with at least one functional group, an aromatic radical or a heterocyclic radical, M represents a monovalent atom or group corresponding to a mineral base of the formula MOH and x has an average value of at least 1, wherein (2) is carried out in a solution consisting essentially of an anhydrous alcohol.

2. Composition according to claim 1 wherein, in (1), said monoolefin is mixed with a minor proportion of at least one aliphatic monoolefin with 2 to 5 carbon atoms.

3. Composition according to claim 1 wherein, in (1), the aliphatic monoolefin(s) is used in a proportion of 1.5 to 2.5 moles per mole of sulfur mono- and/or dichloride and the reaction is carried out at a temperature of 20° to 80° C.

4. Composition according to claim 1 wherein, in the mercaptate or mercaptate-polysulfide formula $R^3S_xM$ used in step (2), $R^3$ represents an aliphatic radical with 1 to 14 carbon atoms, an aliphatic radical with at leat one hydroxyl group, an aromatic radical, possibly substituted by at least one aliphatic radical with 6 to 14 carbon atoms, or a heterocyclic radical containing at least one heteroatom chosen from nitrogen, sulfur and oxygen, M represents a sodium or potassium atom or an ammonium group and x has an average value of not more than 7.

5. Composition according to claim 1 wherein, in (2), the reaction is carried out with an anhydrous aliphatic monoalcohol, said mercaptate or mercaptate-polysulfide is used in a molar excess of about 0.1 to 70% with reference to the stoichiometry of 1 mole per gram-atom of chlorine contained in said addition product and a temperature of $-10°$ C. to the reflux temperature of said monoalcohol is maintained.

6. Composition according to claim 1 wherein the mercaptate used in (2), having the general formula $R^3S_xM$ in which x has an average value equal to 1, is obtained by a process in which at least one mercaptan having the general formula $R^3SH$ is reacted with a MOH mineral base.

7. Composition according to claim 1 wherein the mercaptate-polysulfide used in (2), having the general formula $R^3S_xM$ in which x has an average value greater than 1, is obtained by a process in which at least one mercaptan having the general formula $R^3SH$ is reacted with a MOH mineral base, then with elemental sulfur.

8. Composition according to claim 7 wherein up to about 10 gram-atoms of elemental sulfur per mole of mercaptan are used.

9. Composition according to claim 6 wherein said mineral base is soda, potash or ammonium hydroxide and the reaction is carried out within an aliphatic monoalcohol with 1 to 5 carbon atoms, at a temperature of 20° to 100° C.

10. A composition according to claim 1, obtained by a process comprising reacting in (2), a mixture of two or more addition products from reaction (1).

11. A composition according to claim 1 obtained by a process further comprising (3) contacting the product obtained at the end of (2) with an aqueous solution of a mineral base.

12. A composition according to claim 11 wherein, in (3), the mineral base is aqueous soda or potash solution with a concentration of 0.1 to 50% by weight, and is contacted with the product of step (2) in an amount of 0.1 to 5 times the weight percent of said product resulting from (2).

13. A process for preparing a polysulfurized olefin composition, comprising:
(1) reacting at least one of sulfur monochloride or dichloride with at least one aliphatic monoolefin having 6 to 12 carbon atoms, so as to form an addition product; and
(2) reacting, in a solution consisting essentially of an anhydrous monoalcohol, the addition product obtained at the end of step (1) with at least one mercaptate or mercaptate-polysulfide of the general formula $R^3S_xM$, in which $R^3$ represents an aliphatic radical, an aliphatic radical with at least one functional group, an aromatic radical, an aromatic radical substituted with at least one aliphatic radical or a heterocyclic radical, M represents a monovalent atom or group corresponding to a mineral base of the formula MOH and x has an average value of at least 1.

14. A gearing oil composition comprising a major proportion of a mineral or synthetic lubricating oil and, as an additive, at least one polysulfurized olefin composition according to claim 1 in a proportion of 0.5 to 10% by weight with respect to the oil.

15. A metal-working oil composition comprising a major proportion of a mineral or synthetic lubricating oil and, as an additive, at least one polysulfurized olefin composition according to claim 1 in a proportion of 0.1 to 20% by weight with respect to the oil.

16. Composition according to claim 7 wherein said mineral base is soda, potash or ammonium hydroxide and the reaction is carried out within an aliphatic monoalcohol with 1 to 5 carbon atoms, at a temperature of 20° to 100° C.

17. A composition according to claim 1, wherein the chlorine content is less than about 265 ppm, the viscosity (100° C. mm²/s) is less than about 6.2, and the sulfur content is at least about 43.4%.

* * * * *